(12) United States Patent
McGuire et al.

(10) Patent No.: US 8,111,613 B2
(45) Date of Patent: Feb. 7, 2012

(54) IN-LAYER ETHERNET P-CYCLE PROTECTION SCHEME

(75) Inventors: Alan McGuire, Felixstowe (GB); Sergio F. O. Inglima, Ipswich (GB)

(73) Assignee: British Telecommunications public limited company, London (GB)

( * ) Notice: Subject to any disclaimer, the term of this patent is extended or adjusted under 35 U.S.C. 154(b) by 94 days.

(21) Appl. No.: 12/447,022

(22) PCT Filed: Oct. 12, 2007

(86) PCT No.: PCT/GB2007/003907
§ 371 (c)(1),
(2), (4) Date: Apr. 24, 2009

(87) PCT Pub. No.: WO2008/053146
PCT Pub. Date: May 8, 2008

(65) Prior Publication Data
US 2010/0039934 A1    Feb. 18, 2010

(30) Foreign Application Priority Data

Oct. 31, 2006 (GB) .................................. 0621676.6
Oct. 31, 2006 (GB) .................................. 0621686.5

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .......................... 370/218; 370/244; 709/239
(58) Field of Classification Search .................. None
See application file for complete search history.

(56) References Cited

U.S. PATENT DOCUMENTS 6,535,481 B1 *  3/2003  Andersson et al. ........... 370/225
6,901,048 B1 *  5/2005  Wang et al. ................... 370/228
(Continued)

FOREIGN PATENT DOCUMENTS
WO    WO 2004/023724      3/2004

OTHER PUBLICATIONS

International Search Report for PCT/GB2007/003907, mailed Feb. 4, 2008.

(Continued)

*Primary Examiner* — Chirag Shah
*Assistant Examiner* — Suk Jin Kang
(74) *Attorney, Agent, or Firm* — Nixon & Vanderhye P.C.

(57) ABSTRACT

A method of implementing a p-cycle protection scheme for a communications network comprising a plurality of nodes and interconnecting communications links along which Ethernet traffic is forwarded in a connection-oriented manner. The method comprises for each said Ethernet node in the communications network determining a label associated with each connection-oriented Ethernet path along one or more links in said communications network for which an entry exists in a forwarding table of Ethernet switching apparatus located at said Ethernet node and mapping a plurality of said paths individually identified by said respective labels, to another path defining a p-cycle between logically adjacent nodes in said communications network, wherein each said p-cycle is provisioned in the same layer as said Ethernet traffic.

24 Claims, 6 Drawing Sheets

U.S. PATENT DOCUMENTS

| | | | | |
|---|---|---|---|---|
| 2002/0167898 | A1* | 11/2002 | Thang et al. | 370/216 |
| 2003/0152025 | A1* | 8/2003 | Andersson et al. | 370/216 |
| 2004/0109407 | A1* | 6/2004 | Grover et al. | 370/218 |
| 2005/0041575 | A1* | 2/2005 | Kam et al. | 370/216 |
| 2006/0164976 | A1* | 7/2006 | Grover et al. | 370/228 |
| 2007/0086333 | A1* | 4/2007 | Doukai et al. | 370/228 |
| 2007/0153674 | A1* | 7/2007 | Alicherry et al. | 370/216 |
| 2007/0177597 | A1* | 8/2007 | Ju | 370/392 |
| 2009/0161537 | A1* | 6/2009 | Andersson et al. | 370/225 |
| 2010/0238813 | A1* | 9/2010 | Allan et al. | 370/252 |

OTHER PUBLICATIONS

Grover, Wayne D., "Understanding p-Cycles, Enhanced Rings, and Oriented Cycle Covers", $1^{st}$ International Conference on Optical Communications and Networks, [Online], (Nov. 14, 2002), pp. 305-308.

Schmitt, Jens et al., "Aggregation of Guaranteed Service Flows", Darmstadt University of Technology, [Online], (1999), pp. 147-155.
Halabi, Sam, "Metro Ethernet", [Online], (Oct. 1, 2003), pp. 45-71.
International Preliminary Report on Patentability (1 page) mailed May 5, 2009 for Application No. PCT /GB2007/003907 filed Oct. 12, 2007.
Written Opinion of the International Search Authority (7 pages) for Application No. PCT /GB2007/003907 filed Oct. 12, 2007.
Examination Report (14 pgs.) dated Nov. 5, 2010 issued in corresponding European Application No. 07824158.5.
International Preliminary Report on Patentability (1 page) mailed May 5, 2009 for Application No. PCT /GB2007/003907 filed Oct. 12, 2007.
Written Opinion of the International Search Authority (7 pages) for Application No. PCT /GB2007/003907 filed Oct. 12, 2007.

* cited by examiner

– – – – P-cycle protects demand E-G

— — — P-cycle protects demand E-G

IN-LAYER ETHERNET P-CYCLE PROTECTION SCHEME

This application is the U.S. national phase of International Application No. PCT/GB2007/003907, filed 12 Oct. 2007, which designated the U.S. and claims priority to Great Britain Application Nos. 0621676.6 filed 31 Oct. 2006; and 0621686.5, filed 31 Oct. 2006 the entire contents of each of which are hereby incorporated by reference.

BACKGROUND

1. Technical Field

The present invention relates to an Ethernet protection scheme which is implemented using p-cycle techniques in a connection-oriented Ethernet network.

2. Description of Related Art

Ethernet is an example of an OSI layer 2 communications protocol. Conventional Ethernet switching apparatus forwards received Ethernet frames on the basis of Media Access Control (MAC) address information. The frames are forwarded in a connectionless manner, i.e., the path each frame follows is not pre-configured and each frame is capable of being forwarded by switching apparatus independently along a different route towards the destination MAC address node.

Conventional Ethernet switching apparatus operates a broadcast-on-unknown mode of operation if a frame is received with destination address information for which no association with an outgoing interface (e.g., outgoing port) of the switching apparatus exists in the forwarding table of that switching apparatus. The broadcast-on-unknown (or flooding) process enables the switching apparatus to determine appropriate entries in its forwarding tables in the manner well known to those skilled in the art. However, to ensure that broadcast traffic does not unduly escalate whenever the physical topology of the Ethernet network contains fully connected nodes (which would allow looping to occur), protocols such as Spanning Tree are utilised by the switching apparatus to virtually reconfigure the outgoing ports of the switching apparatus to logically configure the switching nodes into a fully-connected tree configuration and thus eliminate any physical looped topologies.

It is known to adapt switching apparatus arranged to forward Ethernet frames using conventional techniques to support connection-oriented services by populating the switching apparatus directly from the control plane and discarding all frames with unknown destination address information in the header fields. More details on connection-oriented switching using Ethernet frames is known in the art from, for example, International Patent Application WO2006070197 entitled "CONNECTION-ORIENTED COMMUNICATIONS SCHEME FOR CONNECTION-LESS COMMUNICATIONS TRAFFIC" and United States Patent Application US 2005/0220096 entitled "TRAFFIC ENGINEERING IN FRAME-BASED CARRIER NETWORKS" by Friskney et al.

The invention assumes that looped topologies are retained between Ethernet switching apparatus so that one of the abovementioned known methods for reconfiguring the routing tables of Ethernet switching apparatus has already been implemented. This permits multiple paths to be provided for Ethernet traffic between source and destination nodes.

Protection switching is possible whenever multiple paths are possible between source and destination nodes. As is well known to those skilled in the art, protection switching requires an alternative path to be configured in the network which is utilised by traffic whenever a link or node failure on the original path occurs. One conventional protection switching scheme requires a complete alternative path to be pre-configured and for each node on the protection path to allocate appropriate resources so that in the event of the original path failing, traffic can be switched over as rapidly as possible. For example, some known protection schemes require each node on the protection path to reserve bandwidth to match the required path bandwidth. These are referred to in the art as 1+1 protection schemes and are limited in that twice the bandwidth needed by the traffic to be protected must be reserved.

Various schemes are known in the art to reduce the amount of bandwidth which is reserved by a protection scheme, including schemes which are implemented using p-cycles. In brief, a p-Cycle is a protection scheme that pre-reserves bandwidth in the communications network to provide path protection in the event of path failure. P-Cycles are known in the art for both connection-oriented and for connection-less traffic such as traffic using the IP transport communications protocol. Conventionally, p-cycle is configured by entering appropriate routing information into the forwarding table associated with the switching apparatus of a communications network. Once traffic is passed onto the p-cycle, traffic follows the forwarding table entries.

A p-cycle protection scheme does not associate the p-cycle with the working capacity of the network or limit how the protected path is routed. This allows the p-cycle to have any route through the network. Switching speed is maintained by the pre-connection feature of p-cycles as only the end-nodes adjacent to the failed link or node need to switch traffic to the p-cycle. A p-cycle scheme can be implemented locally, by nodes adjacent to the failure, on a time-scale of the order of a few milliseconds.

Figures 1A, 1B, 1C:
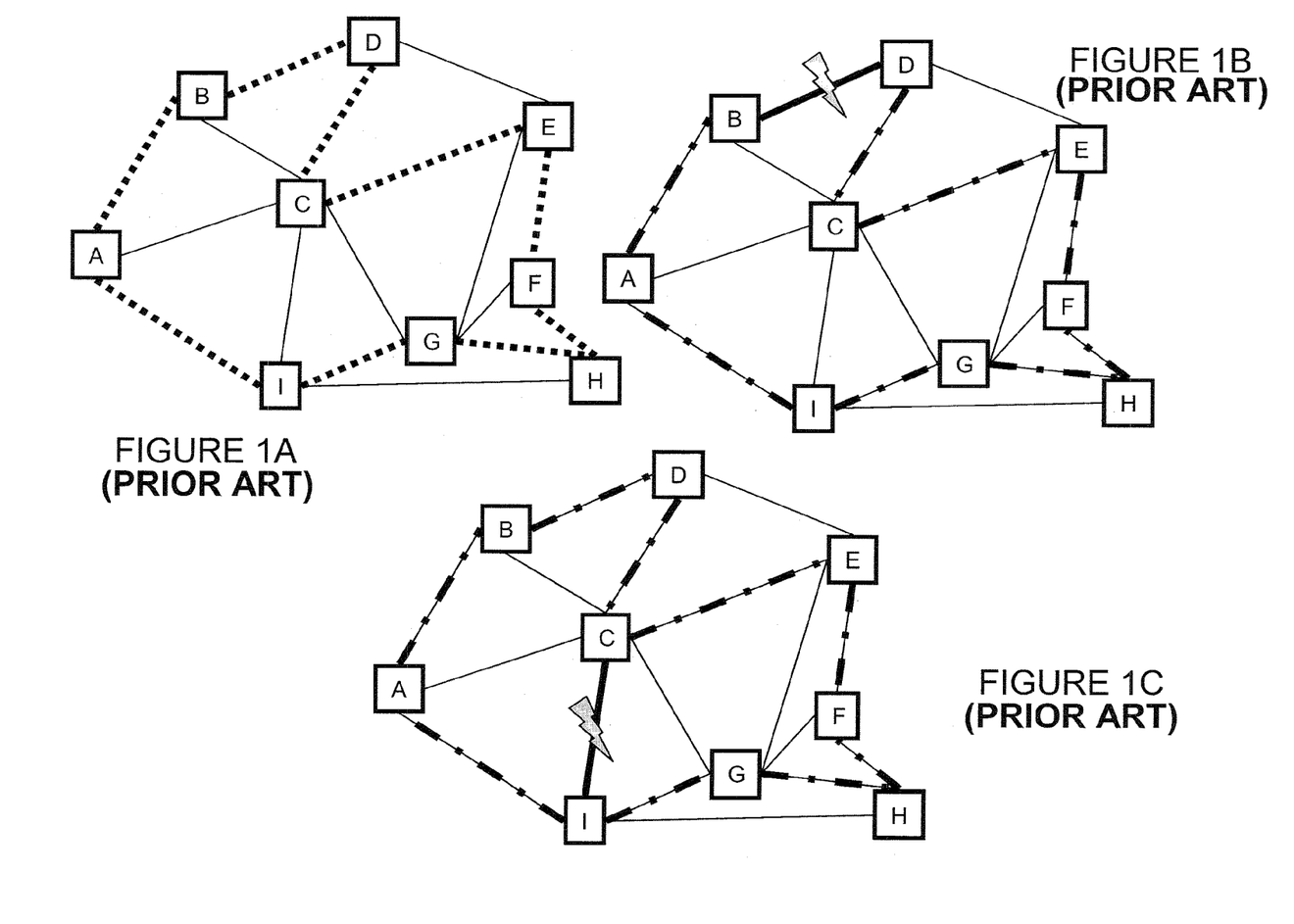
FIG. 1A shows schematically a communications network within which a p-Cycle scheme has been implemented for protection as is known in the art.
FIG. 1B shows schematically an "on-cycle" link failure in the communications network shown in FIG. 1A.
FIG. 1C shows schematically a "straddling" link failure in the communications network shown in FIG. 1A.

FIG. 1A shows an example of a communications network 10 in which a p-cycle such as is known in the art has been provisioned to protect communications traffic. In FIG. 1A, communications network 10 is schematically represented by a plurality of letter labelled nodes 12 and interconnecting physical communication links 14. As is well known to those of ordinary skill in the art, each pair of adjacent nodes 12 may be connected by one or more logical and/or physical communications channels along each physical communications link 14. The term link failure in the context considered herein refers to the failure of the physical link (affecting one or more channels along that link). Communications links 14 shown in FIG. 1A by the thick dashed line form part of a p-cycle 16. The basic properties of p-cycles are already known in the art and more details can be found in the following document, for example see: Network Protection with Ring-speed and Mesh-efficiency", by Schupke, Gruper, Grover and Stamatelakis, COST 270 Workshop, 2001.

Other known protection schemes include ring protection schemes which reserve bandwidth and protect against link and node failures occurring on one of the nodes or links already forming the protection ring (see FIG. 1B). In contrast, p-cycles provide protection for link and node failures both on-ring and "off-ring" (see FIG. 1C for an example of an off-ring failure). "Off-ring" failures are referred to as "straddling failures" in the art.

Referring again to FIGS. 1A to 1C of the accompanying drawings, these show a p-Cycle comprising 9 protected spans "on-cycle". FIG. 1B shows by way of example, how traffic originally going from node B to node D may be protected in the event that the communications link between nodes B and D fails (an on-ring failure). Once the failure has been detected by the node through which traffic passes prior to the failed link (here node B) using any appropriate technique already known to those of ordinary skill in the art, communications traffic at node B is mapped by the forwarding table for node B onto the p-cycle and is transported along the p-cycle pre-provisioned path from node B via nodes A, I, C, H, F, E, and C to finally end up at node D. At node D, the traffic leaves the p-cycle and is forwarded from node D based on the pre-failure entry in the forwarding table for D. In other words, once the traffic is restored to the node following the point of failure, it reverts back to its behaviour prior to encountering the failure.

FIG. 1C shows that the same p-cycle provides protection for 8 "straddling" communications links between non-adjacent nodes on the p-cycle. In FIG. 1C, the communications link between nodes C and I has failed. Traffic originally for routing between nodes I and C is instead routed along one or both of the available paths on the p-cycle via nodes IABDC and/or via nodes IGHFEC.

Additional background information on p-cycles can be found in W. D. Grover, D. Stamatelakis, "*Bridging the ring-mesh dichotomy with p-cycles*," Proc. Second International Workshop on the Design of Reliable Communication Networks (DRCN 2000), Munich, Germany, 9-12 Apr. 2000, pp. 92-104. W. D. Grover, "*Understanding p-cycles, enhanced rings, and oriented cycle covers*," Proc. First International Conference on Optical Communications and Networks (IC-OCN 2002), Singapore, 11-14 Nov. 2002, pp. 305-308. and W. Grover, "*p-Cycles, ring-mesh hybrids and 'ring-mining:' Options for new and evolving optical networks*," slides presented at Optical Fiber Communication Conference (OFC) 2003, Atlanta, Ga., USA, 24-27 Mar. 2003, "p-Cycles: Network Protection with Ring-Speed and Mesh-efficiency" by Schupke, Gruber, Grover and Stamatelakis, COST 270 Workshop 2001; Chapter 10 of "Mesh based Survivable Networks" by Grover, Prentice Hall 2004; and "Automatic Protection Switching for p-cycles in WDM networks" by D A Schupke, Optical Switching & Networking, Elsevier, April 2005.

Whilst p-cycle protection schemes are known in the art, it has hitherto not been possible to implement a p-cycle protection scheme for conventional Ethernet traffic as the broadcast-on-unknown mode of operation of conventional Ethernet switching has resulted in the need for protocols such as spanning tree to be implemented to explicitly prevent any multiple path configurations from being possible within an Ethernet network.

It is known in the art for Ethernet switches to switch off spanning tree so that they can be configured to route traffic to a destination address in a connection-oriented way, for example, based on performing a look-up of both a globally unique identifier such as the MAC destination address and another field identifier such as the VLAN identifier. The globally unique identifier enables Ethernet switching apparatus to switch over an inter-network comprising a plurality of local area networks, and the VLAN-identifier enables different paths to be pursued by Ethernet traffic with the same source and destination address. Other known types of connection oriented Ethernet forwarding include:

Destination Address based forwarding
    forwarding is based on DA, DA is globally unique
MAC swapping
    forwarding is based on DA, DA value can change on link-by-link basis
VLAN switching with global VLAN ID
    forwarding is based purely on the VLAN ID, VLAN ID same on all links
VLAN swapping
    forwarding is based purely on the VLAN ID but value can change on link-by-link basis
Provider Backbone Transport
    forwarding based on VLAN ID and DA—same values on all links.

For each of these connection-oriented Ethernet schemes that it is possible to implement p-cycle protection for Ethernet as the spanning tree protocol is switched off and population of the forwarding tables is done using management configuration options. In contrast to known connection-oriented p-cycle protection schemes, however, the large number of potential links and the volume of the address space of the router tables for Ethernet switching apparatus means that it is not possible to utilize the same approach for an Ethernet p-cycle protection scheme.

The invention relates to a scheme for implementing p-cycle protection for Ethernet traffic, which seeks to avoid the problems associated with the use of assigned or interchanged labels when seeking to implement a p-cycle protection scheme in an Ethernet network.

SUMMARY STATEMENTS OF INVENTION

One aspect of the invention seeks to provide a method of implementing a p-cycle protection scheme for a communications network comprising a plurality of nodes and interconnecting communications links along which Ethernet traffic is forwarded in a connection-oriented manner, the method comprising for each said Ethernet node in the communications network: determining a label associated with each connection-oriented Ethernet path along one or more links in said communications network for which an entry exists in a forwarding table of Ethernet switching apparatus located at said Ethernet node; and mapping a plurality of said paths individually identified by said respective labels, to another path defining a p-cycle between logically adjacent nodes in said communications network, wherein each said p-cycle is provisioned in the same layer as said Ethernet traffic.

In one embodiment, the method further comprises reserving for each connection-oriented Ethernet path in said forwarding table, bandwidth for a plurality of p-cycles between a series of logically adjacent nodes defining said p-cycle.

In one embodiment, the method further comprises determining the location of a point of failure in the communications network has occurred and encapsulating traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes.

In one embodiment, the point of failure is on the p-cycle and traffic is encapsulated at one node logically adjacent to the point of failure and traffic is restored by uni directionally routing the encapsulated traffic around the p-cycle to a node logically adjacent to the far side of the point of failure.

In one embodiment, the point of failure straddles the p-cycle, and traffic is encapsulated at one node logically adjacent to the point of failure and traffic is restored by bi-directionally routing the encapsulated traffic around the p-cycle to a node logically adjacent to the far side of the point of failure.

In one embodiment, the forwarding table of said Ethernet switching apparatus is populated from the control plane.

In one embodiment, the forwarding table of said Ethernet switching apparatus is populated from the management plane.

In one embodiment, the label for each Ethernet path is used to implement one of the following connection-oriented Ethernet forwarding schemes:

a Destination Address (DA) based forwarding scheme using the DA as the label;

a MAC swapping forwarding scheme using a MAC DA which changes on a link-by-link basis as the label;

a VLAN switching with global VLAN ID forwarding scheme using the VLAN ID as the label;

a VLAN swapping forwarding scheme which uses a VLAN ID value which changes on link-by-link basis as the label; and a Provider Backbone Transport forwarding scheme using a VLAN ID and DA combination label which has the same values on all links as the label.

Another aspect of the invention seeks to provide apparatus arranged to forward Ethernet traffic using a connection-oriented Ethernet protocol in a communications network comprising a plurality of nodes and interconnecting communications links along which Ethernet traffic is forwarded in a connection-oriented manner, the apparatus comprising:

a path labeler arranged to determine a label associated with each connection-oriented Ethernet path along one or more links in said communications network for which an entry exists in a forwarding table of Ethernet switching apparatus located at said Ethernet node; and a path mapper arranged to map a plurality of said paths individually identified by said respective labels to another path defining a p-cycle between logically adjacent nodes in said communications network, wherein each said p-cycle is provisioned in the same layer as said Ethernet traffic.

A path labeler will normally be provided by table entries in the forwarding table for the Ethernet switching apparatus. This may be using an entry as an index in the table that indicates where the frame should be forwarded based on forwarding information in the table. The table may also indicate that a label translation is required or a label appended or removed.

A path mapper may be provided by any suitable mechanism for multiplexing multiple paths onto a single path and appending an appropriate label (or labels) to identify the path that the traffic has been multiplexed onto. In other words any multiplexer function could do this.

In one embodiment, the apparatus further comprises a bandwidth reserver arranged to reserve for each connection-oriented Ethernet path in said forwarding table bandwidth for a plurality of p-cycles between a series of logically adjacent nodes defining said p-cycle.

In one embodiment, the apparatus further comprises a bandwidth reserver arranged to reserve for each connection-oriented Ethernet path in said forwarding table, bandwidth for a plurality of p-cycles between a series of logically adjacent nodes defining said p-cycle.

Any suitable mechanism capable of ensuring sufficient bandwidth is reserved may function as a bandwidth reserver, for example, a centralised database that has access to the topology of the network and the connections across it (though this could be on another database) is able to determine what bandwidth has been assigned and what bandwidth is still available. This can be used to calculate an appropriate route that meets the bandwidth requirements. Alternatively a similar approach can be adopted via distributed database where a number of locations (e.g. one database per switch) has a view of topology and can calculate a route and then signal this. If the network information is incorrect then the signalling will reject request and bandwidth requesting entity (the bandwidth reserver) can try an alternative route. This would require some knowledge of the available bandwidth on links to be distributed e.g. via a routing protocol or some other means of distribution.

In one embodiment, the apparatus further comprises a link failure detector to determine the location of a point of failure in the communications network has occurred and a traffic encapsulator arranged to encapsulate traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes.

In one embodiment, the link failure detector comprises a processor arranged to identify faults based on loss of Operations Administration and Management (OAM) information. For example any processor capable of processing Ethernet OAM information such as loss of continuity check frames as described in, for example 802.1ag or any mechanism that indicates that the link is down such as loss of signal. In other words this is what you would find on an Ethernet switch with OAM.

In one embodiment, the point of failure is on the p-cycle and traffic is encapsulated at one node logically adjacent to the point of failure and traffic is restored by uni-directionally routing the encapsulated traffic around the p-cycle to a node logically adjacent to the far side of the point of failure.

In one embodiment, a traffic encapsulator (and/or de-encapsulator) comprises an appropriately configured Ethernet switching apparatus. For example, any Ethernet switch arranged to provide the means of encapsulation or deencapsulation such as one which provides IEEE 802.1ah encapsulation/deencapsulation The encapsulated traffic can be forwarded by any Ethernet switching apparatus arranged to forward Ethernet traffic according to the forwarding paradigm of the means of encapsulation. For example a connection-oriented Ethernet core switch such as PBT core switch.

In one embodiment, the point of failure straddles the p-cycle, and traffic is encapsulated at one node logically adjacent to the point of failure and traffic is restored by bi-directionally routing the encapsulated traffic around the p-cycle to a node logically adjacent to the far side of the point of failure.

In one embodiment, the forwarding table of said Ethernet switching apparatus is populated from the control plane.

In one embodiment, the forwarding table of said Ethernet switching apparatus is populated from the management plane.

In one embodiment, the label for each Ethernet path is used to implement one of the following connection-oriented Ethernet forwarding schemes:

a Destination Address (DA) based forwarding scheme using the DA as the label;

a MAC swapping forwarding scheme using a MAC DA which changes on a link-by-link basis as the label;

a VLAN switching with global VLAN ID forwarding scheme using the VLAN ID as the label;

a VLAN swapping forwarding scheme which uses a VLAN ID value which changes on link-by-link basis as the label; and a Provider Backbone Transport forwarding scheme using a VLAN ID and DA combination label which has the same values on all links as the label.

Another aspect of the invention seeks to provide a communications network comprising a plurality of apparatus aspects of the invention.

Another aspect of the invention seeks to provide a suite of one or more computer programs operable in a communications network aspect of the invention and arranged to implement steps in any method aspect of the invention.

The aspects of the invention and preferred embodiments are as set out above and in the accompanying independent and dependent claims. The aspects and preferred embodiments and features of the invention as described herein and by the accompanying independent and dependent claims respectively may be combined in any appropriate manner apparent to those skilled in the art.

BRIEF DESCRIPTION OF DRAWINGS

Preferred embodiments of the invention will now be described with reference to the accompanying drawings which are by way of example only, and in which.

The best mode of the invention currently contemplated by the inventors will now be described with reference to the accompanying drawings.

DESCRIPTION OF PRESENT EXAMPLE EMBODIMENTS

The term "p-cycle" as used herein refers to a pre-connected looped protection path which is capable providing protection capacity in a similar manner to that of a mesh network. A p-cycle protects two units of working capacity on the straddling spans, and are formed in the spare-capacity layer of a mesh network, and is a pre-connected "unit-capacity" cycle in that it does not require any additional bandwidth to be reserved in advance (i.e., a p-cycle requires the same unit of bandwidth (1) as the traffic it is protecting as opposed to requiring 1+1=2 unites of bandwidth to be reserved (1 unit for the traffic itself and 1 unit for its protection) where 1 unit of traffic is to be protected). Link failures "on-cycle" are protected by the p-cycle providing a single protection path, whereas "straddling" are protected by the p-cycle providing a plurality of protection paths.

If a node or link fails "on-cycle", the cycle (the provisioned path) can be used for a traditional "loop-back" restoration action in the manner of a conventional ring protection scheme. Straddling span failures enable "loop-back" to occur on both sides of the p-cycle simultaneously. Thus each "unit-capacity" p-cycle provides two units of working capacity on each side of the failed straddling link.

A Virtual Local Area Network (VLAN) value is fixed along a VLAN path in an Ethernet network (analogous to time-slot assignment (TSA) in a time-division multiplexed (TDM) network), whereas in a Virtual VLAN the VLAN value is able to change along the path (analogous to time-slot interchange (TSI) in a TDM network).

Figure 2A:
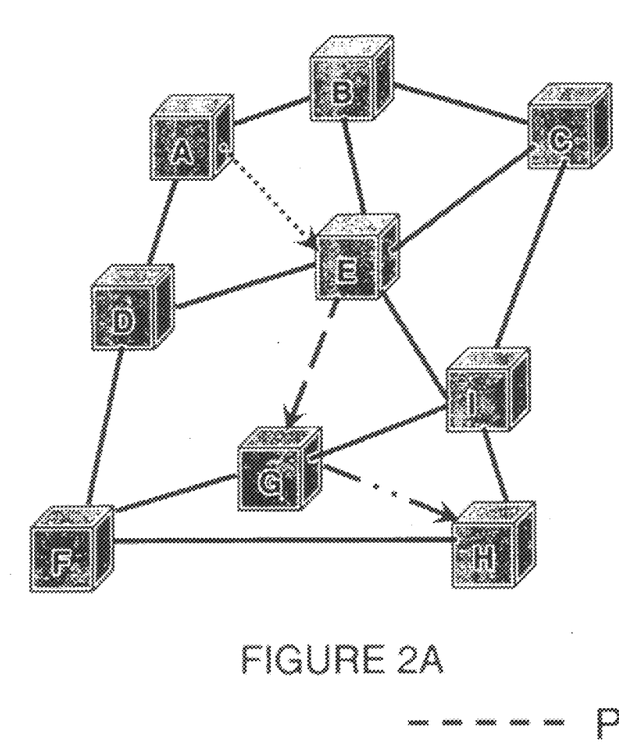
FIGS. 2A and 2B show how a p-cycle is implemented in a virtual VLAN path environment.
Figure 2B:
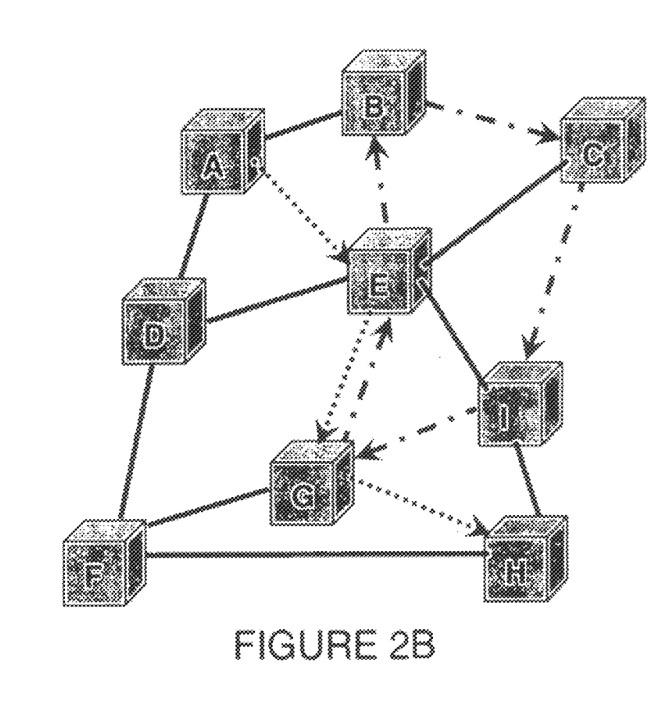

FIG. 2A shows a Virtual VLAN path (VVP) in an Ethernet network in which a VLAN ID is translated (e.g. swapped) on each link (shown schematically by the various types of dashed lines for reach link from nodes A to H). To protect the VLAN on the link E-G a p-cycle is setup (E-B-C-I-G) as shown by the dot-dashed lines. On failure of link E-G traffic on the VLAN is routed around the p-cycle passing from node E adjacent to the failed link, via nodes B, C, and I, back to node G (adjacent to the other side of the failed link), at which point the traffic resumes its path from node G to node H as FIG. 2B shows. In this embodiment of a p-cycle, the same forwarding behaviour as a normal VLAN is implemented with VLAN ID translation at each stage. This allows the p-cycle to be created with any unassigned VLAN ID that is not being used on a link in the network.

Figure 3A:
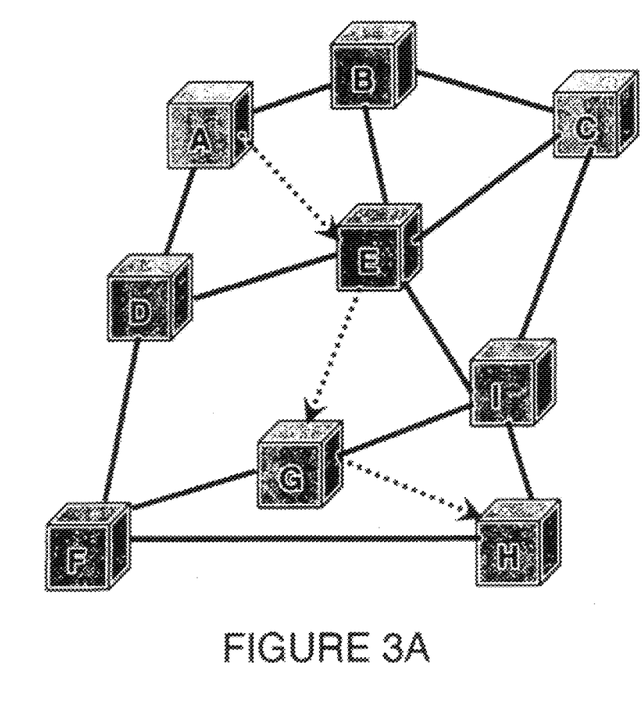
FIGS. 3A and 3B show how a p-cycle is implemented in a VLAN path environment.
Figure 3B:
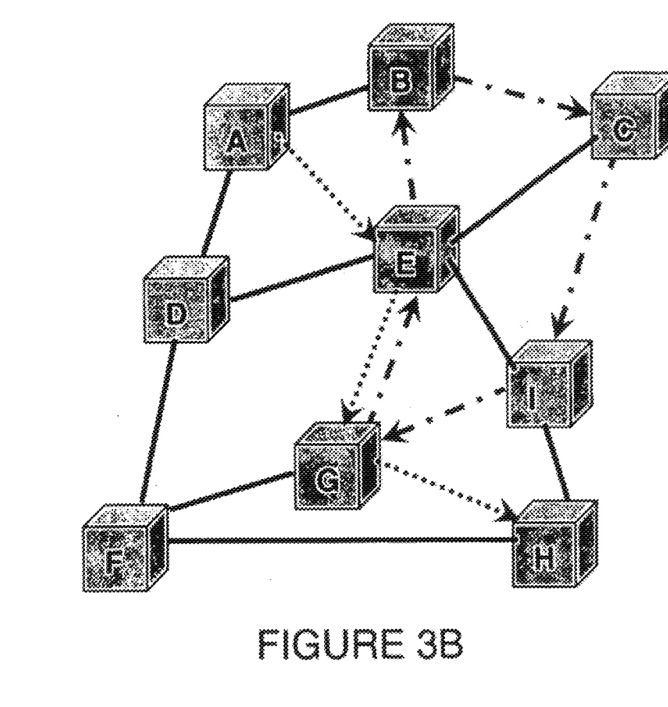

FIG. 3A shows a VLAN path (VP) in an Ethernet network in which nodes have no capability to translate VLAN IDs, and the VLAN ID remains constant along the path. In this embodiment, the p-cycle must use the same VLAN-ID on each hop between nodes E, B, C, I, G, which means that this VLAN-ID must be available on all links used by the p-cycle. As a VLAN-ID needs to be fixed along all links forming a p-cycle for the VLAN path embodiment, but can be changed along one or more links forming a p-cycle for a Virtual VLAN path embodiment, different planning considerations are required for each type of p-cycle environment. FIG. 3B shows how a p-cycle protections scheme can be implemented in this embodiment of the invention.

According to one embodiment of the invention connection-oriented Ethernet p-cycles are created with the same forwarding rules as the traffic. For example, VP and WP p-cycles have small label spaces and the number of p-cycles for each type of path (virtual VLAN or VLAN) is limited to the number of VLANs on a link. Other connection-oriented communications protocols for Ethernet (such as that proposed by the Provider Backbone Transport (PBT) standards submissions to the IEEE standards body, for example, the general discussion available to download from ieee802.org's http world wide website have relatively large label spaces (as a large number of combinations of VLAN ID plus another identifier such as the media access control (MAC) destination address (DA) are possible on each link). Provisioning a p-cycle protection scheme for such protocols is more problematic as to protect connection-oriented Ethernet schemes which have large label spaces to identify connection-oriented traffic flows, a similarly large number of p-cycles is required.

Computing and configuring a large number of p-cycles is not desirable for many reasons. Firstly, the large number of p-cycles will occupy a significant portion of the space in the forwarding tables of the Ethernet switching apparatus which is implementing the connection-oriented Ethernet switching schemes. Secondly, as there is no re-use of p-cycles, a p-cycle can only be used to protect a traffic instance (and not traffic instances on different links with the same identifier as the identifier pool is unique and can't be reused).

The Mac Protocol (MP) and Provider Backbone Transport versions of connection-oriented Ethernet known the art could potentially have as many as $2^{48}$ (based on the MAC address) and $2^{60}$ based on the MAC address plus the VLAN ID (although obviously, in practice the number of connections on a link is usually limited to a more manageable number than the maximum). Accordingly, there remains the problem of determining the optimum number of p-cycles required to protect traffic on a link. Whilst one way of determining the number of p-cycles which are required is to provision the maximum number of p-cycles to be equal to the number of forwarding entries associated with the link, this is not always desirable as this is an overestimate of the required capacity to implement the p-cycle protection scheme, especially in the case of straddling link failures, where each p-cycle is able to restore a straddling link by offering two units of restoration capacity.

The invention proposes to reduce the volume of p-cycles which need to be provisioned to implement a p-cycle protection scheme in a connection-oriented Ethernet network by the use of aggregation or multiplexing. Whereas it is known in the prior art to forward traffic onto a p-cycle by mapping between a "label" on the original path and a "label" on a p-cycle in a one-to-one manner, the invention proposes to implement a virtual approach to multiplex a number of original paths onto a p-cycle.

Accordingly, one embodiment of the invention implements a protection scheme for traffic in a connection-oriented Ethernet network in which the label values (i.e., the VLAN-ID and MAC address or other global address identifier) used to forward traffic are not mapped in a one-to-one mapping from the label values for the normal traffic path to the label value for the p-cycle path. In this way, the p-cycle protection scheme for traffic in a connection-oriented Ethernet network multiplexes a plurality of original paths onto the same p-cycle (by mapping each path's "label" to the same p-cycle "label").

Hierarchical p-cycle protection scheme allows the number of p-cycles to be reduced and requires the multiplexing of several normal traffic flows onto the p-cycle. However, this has the disadvantage mentioned above of requiring an additional header.

For example, a hierarchical MAC-in-MAC protection scheme can be implemented which seeks to provide a relatively fast protection scheme by providing a solution using a connection-oriented protocol (for example, by using a connection-oriented Ethernet protocol p-cycle such as a PBT-layer p-cycle. This requires a predetermined network set-up phase which logically establishes p-cycles in the routing tables of the Ethernet switching apparatus implementing the connection-oriented Ethernet traffic protocol (for example, a connection-oriented Ethernet traffic protocol such as PBT).

The p-cycles are established as virtual circuits (using PBT or any other connection-oriented Ethernet protocol) at the encapsulation level. To implement the p-cycle protection scheme a real-time phase behaviour such as encapsulation of traffic into the p-cycle, deflection around the failure on the p-cycle, and re-introduction of the traffic into the normal traffic stream is required to govern the nodal p-cycle behaviour, e.g., encapsulation requires connection-oriented Ethernet (for example, the Provider Backbone Transport "PBT" standard as defined by IEEE 802.1Qay March 2006) paths impacted by the failure of a node or link in the network to be encapsulated at a node adjacent to the failure with an additional Ethernet header. Forwarding at a node adjacent to the failure then occurs on the p-cycle based on this header.

A connection-oriented Ethernet (also referred to herein by the synecdoche PBT) packet is inserted into a p-cycle if a network node (which includes Ethernet switching apparatus arranged to implement a connection-oriented Ethernet routing protocol) determines the packet's normal routing table entry indicates forwarding into a now-dead port. If so, the packet is encapsulated at that network node with the "p-cycle" header and the encapsulated packet is routed into the p-cycle.

Figure 4A:
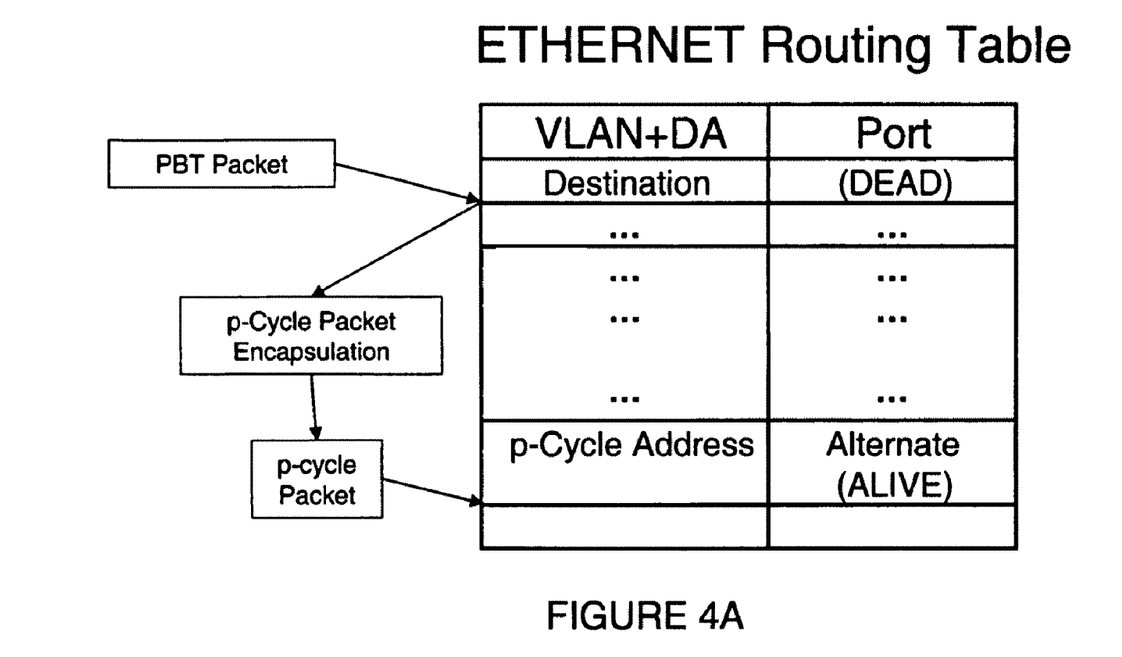
FIG. 4A shows a routing table implementing a P-cycle protection scheme for connection-oriented Ethernet according to one embodiment of the invention.
Figure 4B:
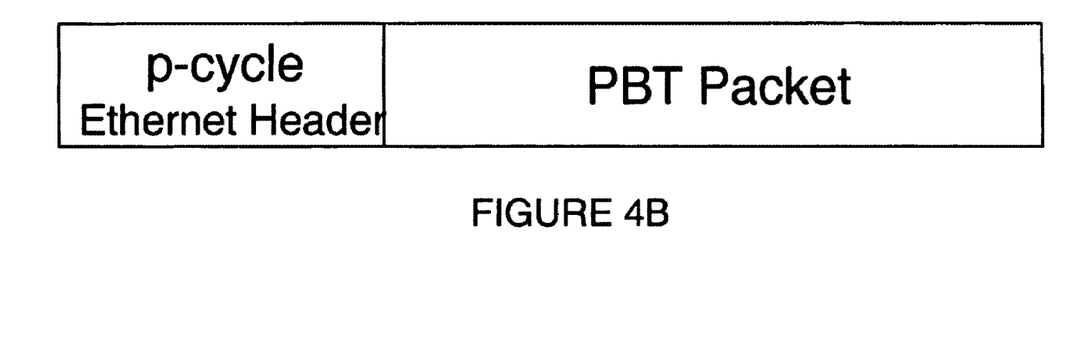
FIG. 4B shows how an Ethernet packet is appended to indicate the p-cycle path according to one embodiment of the invention.

FIG. 4A shows how the routing table operates for a connection-oriented Ethernet layer p-cycle. The p-cycle address is the VLAN ID and MAC address of the p-cycle. Other embodiments of the invention utilise other connection-oriented Ethernet forms of forwarding to the p-cycle is an analogous manner to that shown for connection-oriented Ethernet forwarding. FIG. 4B shows a p-cycle header which comprises an Ethernet header appended to the original Ethernet packet. The p-cycle packet contains an identifier for the p-cycle on which the packet belongs and any other relevant Ethernet header information for the particular connection-oriented Ethernet protocol involved. No cost is indicated, as the forwarding entry is configured in the Ethernet nodes implementing the protection scheme directly from the control plane.

In one embodiment, packets are forwarded by using the outer encapsulating header to go to the end of the p-cycle. As an alternative, however, as in a connection-oriented network with a global address space, a router will only have routing entries which correspond to connections directly supported by the switching equipment of a particular network node, in a preferred embodiment of the invention, packets are forwarded by a receiving network node examining the inner header and if a routing entry exists for the global label, then this is used to forward the packet (as this refers to the connection). This embodiment avoids the need to fold the path at the end of the p-cycle (i.e., to avoid doubling back along the protection path) where protected traffic could be re-routed off the p-cycle earlier, and requires packets to be treated by Ethernet tables in a modified way.

Figure 5A:
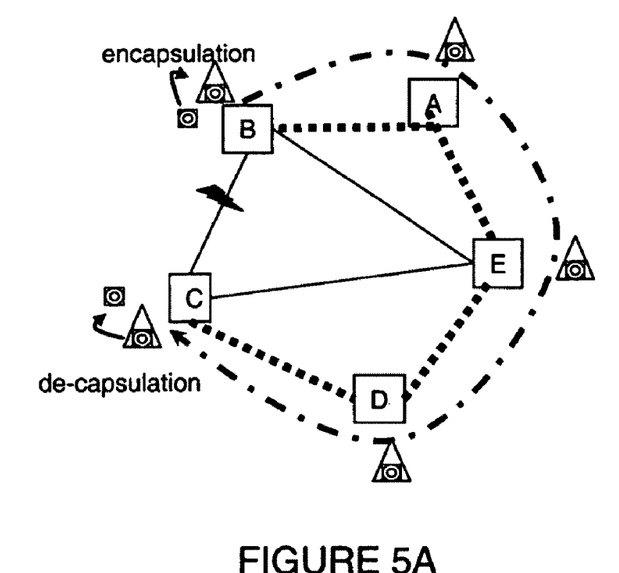
FIGS. 5A and 5B show how a p-cycle Ethernet protection scheme can be implemented for one-cycle and straddling link failures respectively according to another embodiment of the invention.
Figure 5B:
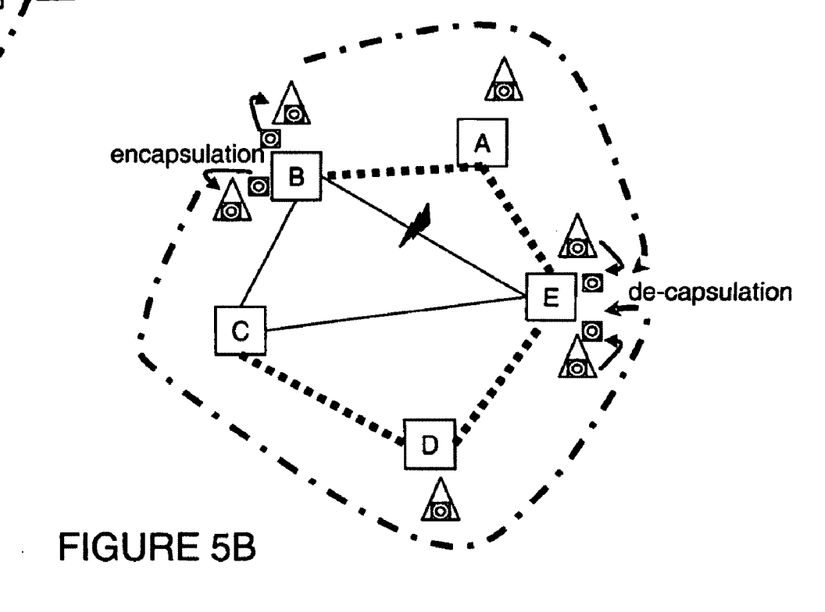

FIG. 5A of the accompanying drawings shows an example of how a protection scheme according to the invention can be implemented for an on-cycle failure between nodes B and C and FIG. 5B shows the analogous scenario where a straddling failure has occurred between nodes B and E.

In FIG. 5A, nodes B and C are adjacent to the failed link. In order to route traffic from B to C, node B encapsulates data into p-cycles and routes the p-cycle through nodes A, E, D to the destination node C. Node C de-encapsulates the data. In contrast, in FIG. 5B, nodes B and E are adjacent to the failed link. Accordingly, at node B, data is encapsulated and sent around the p-cycle in each direction to node E where it is de-encapsulated.

In this way, a p-cycle provides one restoration path for on-cycle failures and two restoration paths for off-cycle failures. In either case, the scheme is implemented by detecting a failure of a link, which results in the Ethernet switching node adjacent to the failure marking the port to that link as dead. This triggers encapsulation of any connection-oriented Ethernet packets which would normally be forwarded on that port and the encapsulated packets are forwarded along the p-cycle to the far end of the p-cycle, where the connection-oriented Ethernet packet is de-encapsulated and forwarded using the de-encapsulated connection-oriented Ethernet header. Several connection-oriented Ethernet paths are multiplexed onto the same connection-oriented Ethernet cycle simply by encapsulating each connection-oriented Ethernet path with the same connection-oriented Ethernet p-cycle identifier(s).

In one embodiment of the invention, on-span failures are dealt with as follows when a p-cycle packet arrives at a switching node in the network:
i) the node checks if it has a routing entry (with a functional port) for the encapsulating Ethernet header;
ii) if yes, continue the packet along the p-cycle
iii) if no, then the packet has reached the end of the p-cycle, i.e. the packet has arrived at the other end of the failed link, (the de-encapsulation point). Then the switch removes the PBT packet from the p-cycle packet and routes it "normally" from this node.

I.e, when the end of the p-cycle is reached, there must be an entry in the routing table of the de-encapsulating node for the packet.

If, however, a straddling span failure has occurred, then a different technique is required as the above technique would result in loops (which are not tolerated in Ethernet as they are potentially disruptive to the stability of the network). As loops must be avoided (and to determine when a straddling span failure has occurred, each node requires state information on whether ports are straddling spans or not, and two further issues must be resolved to implement a protection scheme:

i) The encapsulation process needs to consider how to include an indication of which way round the P-Cycle to route the encapsulated traffic, and to consider how the end node of the P-Cycle is to be identified.

ii) An additional criterion for de-encapsulation at the destination is also required. In one embodiment of the invention, if a node receives a P-cycle labeled packet when there is a port failure on a straddling link (this will have to be pre-configured to the node as start time information) then this also implies de-encapsulation and a return to normal routing. Alternatively, the frame inside the encapsulating frame can be checked to see if it has a valid VLAN ID and MAC address (or for other connection-oriented Ethernet protocols, any other unique global address (or address combination)).

In order to trigger an Ethernet p-cycle protection scheme, a failed Ethernet link must be detected. One embodiment detects failed links using a connectivity check function such as that described in IEEE Ethernet standard Y.1731. Y.1731 'OAM functions & mechanisms' for Ethernet based networks provides a connectivity check (CC) function that can be used to detect loss of continuity as well as a mis-connection. It is based on the periodic sending of OAM frames within a range of possible time-frames—several periods available (3.3 ms up to 10 mins.) in the Y.1731 standard, although 3.3 ms is the standard for protection switching application. The OAM frame is used by Ethernet switching apparatus to establish link failure and thereby trigger switching onto a p-cycle.

To implement a modified form of automatic protection switching (APS) onto a p-cycle in one embodiment of the invention, capacity is reserved to enable the APS-like protocol to exchange signalling messages between Ethernet switches using OAM frame data.

In one embodiment of the invention, the p-cycle is in the same layer as the traffic but still allows some form of aggregation. The VLAN ID and DA combination is globally unique but cannot be used for aggregation although they can be used to create a conventional p-cycle In this embodiment of the invention, forwarding in the p-cycle uses a different mechanism from the normal traffic that also allows aggregation of several working paths onto the p-cycle. Accordingly, this embodiment avoids the need to provide an additional header and so forwards on something other than the global identifier used by the connection-oriented Ethernet forwarding scheme, i.e., for PBT, other than VLAN ID+MAC DA.

Figure 6:
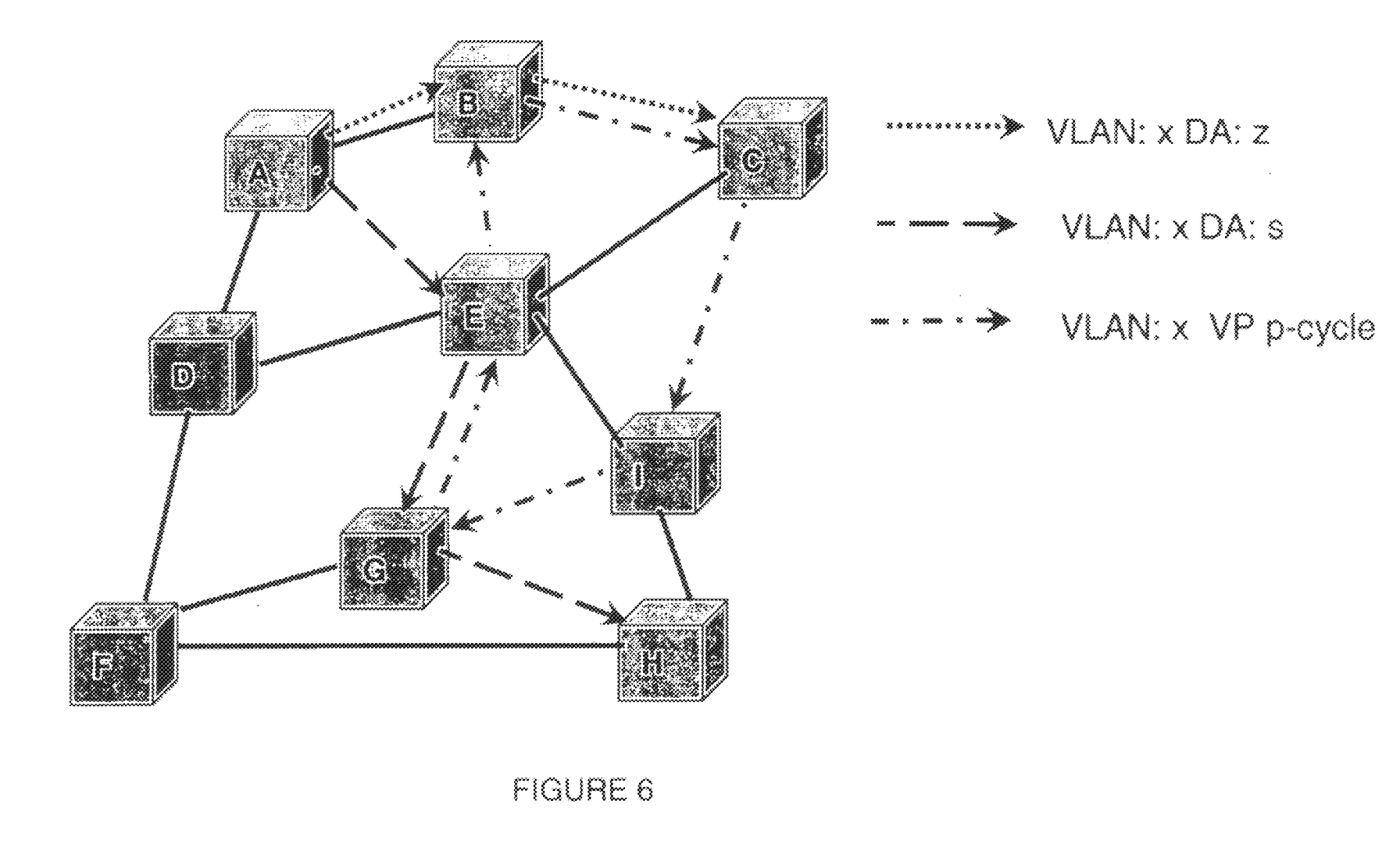
FIG. 6 shows a non-hierarchical p-cycle protection scheme.

Consider when a p-cycle protection scheme for connection-oriented Ethernet traffic is implemented using a label such as the VLAN ID alone—as a VLAN has only a meaning in the context of the DA with which it is associated, this creates a problem which FIG. 6 of the accompanying drawings illustrates.

FIG. 6 of the accompanying drawings shows two forwarding paths, the first is VLAN X, DA z (the dotted line), the second is VLAN X DA S (the long dashed line). Forwarding on these paths is by means of the VLAN ID plus the Destination Address.

Consider a p-cycle formed from a VLAN that can protect for example link in which a p-cycle is formed using only the VLAN ID. In this case there is a problem in that there is no way to distinguish between traffic that should be on the p-cycle on link B-C and normal traffic that has the same VLAN ID but a MAC address that should not be used in the p-cycle. I.e., if the p-cycle forwards on the VLAN ID then VLAN: x DA: z will be incorrectly routed onto the p-cycle.

One embodiment of the invention addresses this problem by assuming every PBT connection is point to point between two edge nodes in the network and that restoration by the p-cycle scheme is on a 1:1 basis, upon link detection failure (for example by ITU-T Y.1731 CC) the switch at each end of the link updates its forwarding table so that every VLAN ID+DA involved in forwarding to the port connected to the failed link is deemed dead.

Another embodiment reserves a VLAN ID for use in the p-cycle protection scheme which is used for normal PBT forwarding or for connection-less Ethernet traffic VLANs either. The reserved VLAN ID is unique for each covered PBT connection.

The following action is performed for any incoming packet flow which was forwarded to the failed link:

Modify VLAN ID to the reserved P-Cycle number, say x (note this new value x is unique to each PBT connection)

Then the switch automatically forwards the modified packet onto the P-Cycle

Each on cycle switch receives this modified packet checks the VLAN ID=x and simply ignores the DA, i.e. it forwards based on only the reserved VLAN ID. It forwards the packet out onto the port which continues its route along the P-Cycle When the packet reaches the node which was adjacent to the link failure the node is programmed to modify the VLAN ID=x and return it to the original value The packet can then return to normal PBT forwarding The proposed scheme will work for both on cycle and straddling span failure (though in the latter a configuration time decision will need to be made as to which way round cycle the connection will be restored). The P-Cycle forwarding is unusual within the cycle it basically requires a new rule to forward only on the VLAN=x and ignore the value of the DA. It will require a unique reserved VLAN ID for each covered PBT connection—this is not as scalable as the hierarchical approach.

Thus in an in-layer P-Cycle operation a reserved VLAN ID is used to modify the failed PBT circuit frame header. The frame is then forwarded around the P-Cycle (based on a VLAN ID forwarding only) until the node adjacent to the link failure is reached. Then the VLAN ID is returned to its original value. Each P-Cycle node will have a mapping in memory between original and P-Cycle VLAN IDs.

Modifications to the above features of the invention and features having equivalent effect to the features known to those skilled in the art are implicitly included in the description, and the scope of the invention should be determined by the accompanying claims.

The invention claimed is:

1. A method of protecting Ethernet traffic in a communications network comprising a plurality of Ethernet nodes configured to implement a p-cycle, the communications network comprising a plurality of Ethernet nodes and interconnecting communications links along which Ethernet traffic is forwarded in a connection-oriented manner, the method comprising:

at a said Ethernet node implementing said p-cycle in the communications network:

mapping a plurality of said paths, each path being individually identified for the purpose of forwarding by a VLAN ID label having an original value and a destination address associated with a connection-oriented Ethernet path along one or more links in said communications network for which an entry exists in a forwarding table of an Ethernet switching apparatus at said Ethernet node, to another path identified for the purposes of forwarding by one or more reserved VLAN ID values, said path defining said p-cycle between logically adjacent nodes in said communications network, wherein each Ethernet node on the p-cycle has a mapping in memory between the original value and p-cycle connection value VLAN identifiers, and wherein said p-cycle is provisioned in the same layer as said Ethernet traffic by:

modifying a connection-oriented Ethernet frame header of a failed Ethernet connection received with a said original VLAN ID value to a said reserved VLAN ID value, wherein said reserved VLAN ID value is unique for each Ethernet connection to be forwarded along said p-cycle;

forwarding each Ethernet frame having said modified VLAN ID around the p-cycle using said reserved VLAN ID until the node adjacent to the link failure is reached and ignoring said destination address for the purposes of forwarding, and at that adjacent node, returning the modified VLAN ID value to the original VLAN ID value, and forwarding each Ethernet frame having a VLAN ID returned to the original value VLAN ID using said original value VLAN ID and destination address.

2. A method as claimed in claim 1, further comprising:
reserving for each connection-oriented Ethernet path in said forwarding table, bandwidth for a plurality of p-cycles between a series of logically adjacent nodes defining each said p-cycle.

3. A method as claimed in claim 1, further comprising:
determining the location of a point of failure in the communications network has occurred; and
encapsulating said Ethernet traffic at one or more logically adjacent nodes to said failure where the forwarding table entry at each said logically adjacent node indicate that traffic is to be forwarded via the point of failure, wherein the Ethernet traffic is encapsulated with unique p-cycle header identifying information for the p-cycle path protecting the link between said logically adjacent nodes.

4. A method as claimed in claim 1, further comprising:
determining the location of a point of failure in the communications network has occurred; and
encapsulating Ethernet traffic at one or more logically adjacent nodes to said failure where the forwarding table entry at each said logically adjacent node indicate that Ethernet traffic is to be forwarded via the point of failure, wherein the traffic is encapsulated with unique p-cycle header identifying information for the p-cycle path protecting the link between said logically adjacent nodes,
wherein the point of failure is on the p-cycle and traffic is encapsulated at one node logically adjacent to the point of failure and traffic is restored by uni-directionally routing the encapsulated traffic around the p-cycle to a node logically adjacent to the far side of the point of failure.

5. A method as claimed in claim 1, further comprising:
determining the location of a point of failure in the communications network has occurred; and
encapsulating traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes,
wherein the point of failure straddles the p-cycle, and traffic is encapsulated at one node logically adjacent to the point of failure and traffic is restored by bi-directionally routing the encapsulated traffic around the p-cycle to a node logically adjacent to the far side of the point of failure.

6. A method as claimed in claim 1, wherein the forwarding table of said Ethernet switching apparatus is populated from the control plane.

7. A method as claimed in claim 1, wherein the forwarding table of said Ethernet switching apparatus is populated from the management plane.

8. A method as claimed in claim 1, wherein the label for each Ethernet path is used to implement one of the following connection-oriented Ethernet forwarding schemes:
a Destination Address (DA) based forwarding scheme using the DA as the label;
a MAC swapping forwarding scheme using a MAC DA which changes on a link-by-link basis as the label;
a VLAN switching with global VLAN ID forwarding scheme using the VLAN ID as the label;
a VLAN swapping forwarding scheme which uses a VLAN ID value which changes on link-by-link basis as the label; and
a Provider Backbone Transport forwarding scheme using a VLAN ID and DA combination label which has the same values on all links as the label.

9. An apparatus arranged to forward Ethernet traffic using a connection-oriented Ethernet protocol in a communications network comprising a plurality of Ethernet nodes and interconnecting communications links along which Ethernet traffic is forwarded in a connection-oriented manner, the apparatus comprising:
an Ethernet switching apparatus;
means to implement a p-cycle in the communications network comprising:
a path labeller arranged to determine a VLAN ID label having an original value and destination address associated with each connection-oriented Ethernet path along one or more links in said communications network for which an entry exists in a forwarding table of said Ethernet switching apparatus;
a path mapper arranged to map a plurality of said paths, each path being individually identified for the purpose of forwarding by a said respective VLAN ID label value and destination address to another path identified for the purpose of forwarding by one or more reserved VLAN ID value defining a p-cycle between logically adjacent nodes in said communications network, wherein each said p-cycle is provisioned in the same layer as said Ethernet traffic by modifying in each Ethernet frame header said original VLAN ID value to a said reserved VLAN ID value, wherein the said reserved VLAN ID value is unique for each Ethernet connection forwarded along said p-cycle; and
a mapping in memory between the original and p cycle VLAN identifiers; the apparatus further comprising:
means to operate said in-layer p-cycle operation using said reserved VLAN ID value to modify the original VLAN ID value of a failed connection-oriented Ethernet frame header; and means to forward the Ethernet frame having said modified VLAN ID value around the p-cycle using said VLAN ID until the node adjacent to the link failure is reached and ignoring said destination address for the purposes of said forwarding;

wherein if said apparatus comprises said adjacent node, the apparatus is configurable to return the modified VLAN ID value to the original VLAN ID value and forward each Ethernet frame having a VLAN ID returned to the original value VLAN ID using said original value VLAN ID and destination address.

10. The apparatus as claimed in claim 9, further comprising:
a bandwidth reserver arranged to reserve for each connection-oriented Ethernet path in said forwarding table bandwidth for a plurality of p-cycles between a series of logically adjacent nodes defining said p-cycle.

11. The apparatus as claimed in claim 9, further comprising:
a failure detector to determine the location of a point of failure in the communications network has occurred; and
a traffic encapsulator arranged to encapsulate traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes.

12. The apparatus as claimed in claim 9, further comprising:
a failure detector to determine the location of a point of failure in the communications network has occurred; and
a traffic ecapsulator arranged to encapsulate traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes
wherein he point of failure is on the p-cycle and traffic is encapsulated at one node logically adjacent to the point of failure and traffic is restored by uni-directionally routing the encapsulated traffic around the p-cycle to a node logically adjacent to the far side of the point of failure.

13. The apparatus as claimed in claim 9, further comprising:
a failure detector to determine the location of a point of failure in the communications network has occurred; and
a traffic encapsulator arranged to encapsulate traffic at one or more logically adjacent nodes to said failure where the forwarding table entry at each said logically adjacent node indicate that traffic is to be forwarded via the point of failure, wherein the traffic is encapsulated with unique p-cycle header identifying information for the p-cycle path protecting the link between said logically adjacent nodes,
wherein the point of failure straddles the p-cycle, and traffic is encapsulated at one node logically adjacent to the point of failure and traffic is restored by bi-directionally routing the encapsulated traffic around the p-cycle to a node logically adjacent to the far side of the point of failure.

14. The apparatus according to claim 9, wherein the forwarding table of said Ethernet switching apparatus is populated from the control plane.

15. The apparatus according to claim 9, wherein the forwarding table of said Ethernet switching apparatus is populated from the management plane.

16. The apparatus claimed in claim 9, wherein the label for each Ethernet path is used to implement one of the following connection-oriented Ethernet forwarding schemes:
a Destination Address (DA) based forwarding scheme using the DA as the label;
a MAC swapping forwarding scheme using a MAC DA which changes on a link-by-link basis as the label;
a VLAN switching with global VLAN ID forwarding scheme using the VLAN ID as the label;
a VLAN swapping forwarding scheme which uses a VLAN ID value which changes on link-by-link basis as the label; and
a Provider Backbone Transport forwarding scheme using a VLAN ID and DA combination label which has the same values on all links as the label.

17. A communications network comprising a plurality of apparatus as claimed in claim 9.

18. A non-transitory computer-readable storage medium storing a suite of one or more computer programs operable in a communications network as claimed in claim 17.

19. A method of forwarding a packet flow along a connection, the method comprising:
receiving, at a switch node, said packet flow for forwarding along a failed communications link;
modifying a VLAN ID for said packet flow from an original VLAN ID value to a value uniquely reserved for the connection along a p-cycle;
forwarding the packet flow having said modified VLAN ID value along said p-cycle;
at each switch node on the path of said p-cycle:
receiving modified packets of said packet flow,
checking the VLAN identifier has a value unique to the connection for that p-cycle; and
forwarding the modified packets out onto a port for continuing a route along the p-cycle;
and
at a switch node adjacent to the failed link:
returning the VLAN identifier value from the value uniquely reserved for the packet flow connection along said p-cycle to the original VLAN identifier value for said packet flow; and
forwarding the packet flow using the original VLAN identifier value and destination address,
whereby each switch on said p-cycle is configured to ignore the destination address of each modified packet flow when forwarding said packets along said p-cycle.

20. A method of forwarding Ethernet traffic along a preconfigured looped protection path p-cycle in a communications network comprising a plurality of Ethernet nodes configured to implement said p-cycle, the communications network comprising a plurality of Ethernet nodes and interconnecting communications links along which Ethernet traffic is forwarded in a connection-oriented manner, the method comprising:
at least one of said Ethernet nodes implementing said p-cycle in the communications network:
mapping a plurality of said paths, each path being individually identified for the purpose of forwarding by a VLAN ID label having an original value and destination address associated with a connection-oriented Ethernet path along one or more links in said communications network for which an entry exists in a forwarding table of an Ethernet switching apparatus at said Ethernet node, to another path identified for the purposes of forwarding by one or more reserved VLAN ID values defining said p-cycle between logically adjacent nodes in said communications network, each Ethernet node on said p-cycle having a mapping in memory between the original value and p-cycle connection value VLAN identifiers, and operating a p-cycle in the same layer as said Ethernet traffic by:

modifying each Ethernet frame header with said original VLAN ID value to a said reserved VLAN ID value, wherein the said reserved VLAN ID value is unique for each Ethernet connection forwarded along said p-cycle, for a failed Ethernet connection; and forwarding each Ethernet frame having a said modified VLAN ID around the p-cycle using said reserved VLAN ID until the node adjacent to the link failure is reached and ignoring said destination address for the purposes of forwarding.

21. An Ethernet node for forwarding Ethernet traffic in a communications network comprising a plurality of Ethernet nodes configured to implement a p-cycle, the communications network comprising a plurality of Ethernet nodes and interconnecting communications links along which Ethernet traffic is forwarded in a connection-oriented manner, the node comprising:

means to implement said p-cycle in the communications network comprising:

means for mapping a plurality of said paths, each path being individually identified for the purpose of forwarding by a VLAN ID label having an original value and a destination address associated with a connection-oriented Ethernet path along one or more links in said communications network for which an entry exists in a forwarding table of an Ethernet switching apparatus at said Ethernet node, to another path identified for the purposes of forwarding by one or more reserved VLAN ID values, said path defining said p-cycle between logically adjacent nodes in said communications network, a mapping in memory between the original value and p-cycle connection value VLAN identifiers, and means to provision said p-cycle in the same layer as said Ethernet traffic comprising:

means to modify a connection-oriented Ethernet frame header of a failed Ethernet connection received with a said original VLAN ID value to a said reserved VLAN ID value, wherein the said reserved VLAN ID value is unique for each Ethernet connection to be forwarded along said p-cycle;

means to forward each Ethernet frame having a said modified VLAN ID around the p-cycle using said reserved VLAN ID until the node adjacent to the link failure is reached and ignoring said destination address for the purposes of forwarding.

22. A node as claimed in claim 21, comprising said adjacent node, and further comprising:

means to return the modified VLAN ID value to the original VLAN ID value, and means to forward each Ethernet frame having a VLAN ID returned to the original value VLAN ID using said original value VLAN ID and destination address.

23. An Ethernet node arranged to implement a p-cycle protection scheme for a communications network comprising a plurality of nodes and interconnecting communications links along which Ethernet traffic is forwarded in a connection-oriented manner, the Ethernet node comprising:

means for determining a forwarding label comprising a VLAN identifier original value and a destination address, each said forwarding label being associated with a connection-oriented Ethernet path along one or more links in said communications network for which an entry exists in a forwarding table of an Ethernet switching apparatus located at the said Ethernet node; and means for mapping a plurality of said paths individually identified for forwarding purposes along a working path by said respective forwarding labels, to a protection path identified for forwarding purposes by a reserved VLAN identifier, the protection path defining a p-cycle between logically adjacent nodes in said communications network, wherein each said p-cycle is provisioned in the same encapsulation layer as said Ethernet traffic, wherein the reserved VLAN identifier is unique to each Ethernet connection forwarded on said protected path;

means for forwarding within said p-cycle Ethernet traffic using the reserved VLAN identifier value and ignoring the destination address value; and means for forwarding Ethernet traffic not on a said p-cycle using the original VLAN identifier value and the destination address value.

24. A method of implementing a p-cycle protection scheme for a communications network comprising a plurality of nodes and interconnecting communications links along which Ethernet traffic is forwarded in a connection-oriented manner, the method comprising:

at an Ethernet node implementing said p-cycle protections scheme:

determining a forwarding label comprising a VLAN identifier original value and a destination address, each said forwarding label being associated with a connection-oriented Ethernet path along one or more links in said communications network for which an entry exists in a forwarding table of an Ethernet switching apparatus located at the said Ethernet node; and mapping a plurality of said paths individually identified for forwarding purposes along a working path by said respective forwarding labels, to a protection path identified for forwarding purposes by a reserved VLAN identifier, the protection path defining a p-cycle between logically adjacent nodes in said communications network, wherein each said p-cycle is provisioned in the same encapsulation layer as said Ethernet traffic, wherein the reserved VLAN identifier is unique to each Ethernet connection forwarded on said protected path, forwarding within said p-cycle Ethernet traffic using the reserved VLAN identifier value and ignoring the destination address value; and forwarding Ethernet traffic not on a said p-cycle using the original VLAN identifier value and the destination address value.

* * * * *